(No Model.)

T. C. SMITH.
MUSHROOM BULLET.

No. 549,334. Patented Nov. 5, 1895.

WITNESSES
H. A. Lamb
S. V. Richardson

INVENTOR
Thomas C. Smith
By A. V. Wooster
Atty

UNITED STATES PATENT OFFICE.

THOMAS C. SMITH, OF BRIDGEPORT, CONNECTICUT, ASSIGNOR TO THE UNION METALLIC CARTRIDGE COMPANY, OF SAME PLACE.

MUSHROOM-BULLET.

SPECIFICATION forming part of Letters Patent No. 549,334, dated November 5, 1895.

Application filed July 27, 1895. Serial No. 557,328. (No model.)

*To all whom it may concern:*

Be it known that I, THOMAS C. SMITH, a citizen of the United States, residing at Bridgeport, in the county of Fairfield and State of Connecticut, have invented certain new and useful Improvements in Mushroom-Bullets; and I do hereby declare the following to be a full, clear, and exact description of the invention, such as will enable others skilled in the art to which it appertains to make and use the same.

My invention has for its object the production of an integral closed-end mushroom-bullet.

The term "mushroom" as applied to bullets means, in the broad sense, any bullet which, when it meets with resistance after firing, will mushroom or flatten out, the shape which the bullet will assume upon striking being uncertain and depending greatly upon the quality of the resistance, but the bullet after mushrooming will be always an irregular jagged mass. The object in using this class of bullets is to produce a large and lacerated wound, accompanied by great shock, the bullet having but comparatively-little penetrative power, as compared with the ordinary conical bullet, which will penetrate without making a lacerated wound. This class of bullets is now being used quite extensively in hunting large game—as, for instance, lions, tigers, and elephants—where it is desirable to produce the severest shock possible, so as to disable the animal instantly, and also in hunting small game—as, for instance, rabbits—where it is necessary to use guns of small caliber, and is also desirable to produce such a severe shock that a wounded animal cannot escape.

So far as I am aware the mushroom-bullets now in use are either open at the end or are closed by caps, plugs, and in other ways, which add greatly to the cost of manufacture and produce bullets which are not satisfactory to the trade, owing to the fact that they do not present the neat and attractive appearance of the ordinary solid bullet.

My present invention overcomes the objections to the various mushroom-bullets now in use, in that it enables me to provide an integral closed-end mushroom-bullet which shall have a neat and attractive appearance, but will be readily distinguishable from solid bullets on account of its lightness.

With this end in view I have invented and produced the novel bullet, which I will now describe, referring by numbers to the accompanying drawings, forming part of this specification, in which—

Figure 1:
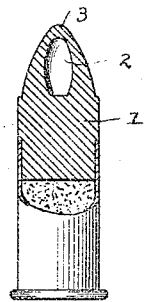
Figure 2:
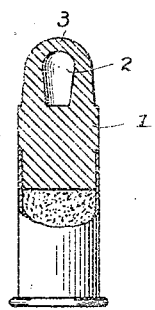
Figure 3:
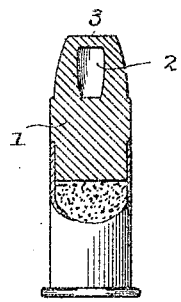
Figure 4:

Figures 1, 2, and 3 are sectional views illustrating my novel mushroom-bullet in connection with a loaded cartridge; and Fig. 4 is a sectional view of a mushroom-bullet that has been fired, this view showing in a general way the effect of resistance upon this class of bullets, it being understood, however, that the shape which the bullet will assume upon meeting with resistance is wholly uncertain and never twice alike. In many instances, as upon striking a bone, it flattens out completely, and all resemblance to its original shape is lost.

1 denotes the body of the bullet formed of relatively soft and compressible metal, such as lead; 2, an internal recess near the forward end of the bullet, and 3 the point of the bullet, the exterior of which is perfectly smooth.

The manner in which my novel bullet is made is not of the essence of my invention. It is sufficient for the purposes of this specification to say that a central recess is first formed in the slug, after which the forward end of the bullet is closed in solidly without destroying the recess in the interior of the bullet, as clearly shown in the drawings.

Having thus described my invention, I claim—

An integral mushroom bullet formed of relatively soft and compressible metal, such as lead, having in its forward end a closed recess the walls of which are formed by the metal of the bullet, substantially as shown and described.

In testimony whereof I affix my signature in presence of two witnesses.

THOMAS C. SMITH.

Witnesses:
 THOMAS H. RYLANDS,
 GEO. B. THORPE.